Figure 1:
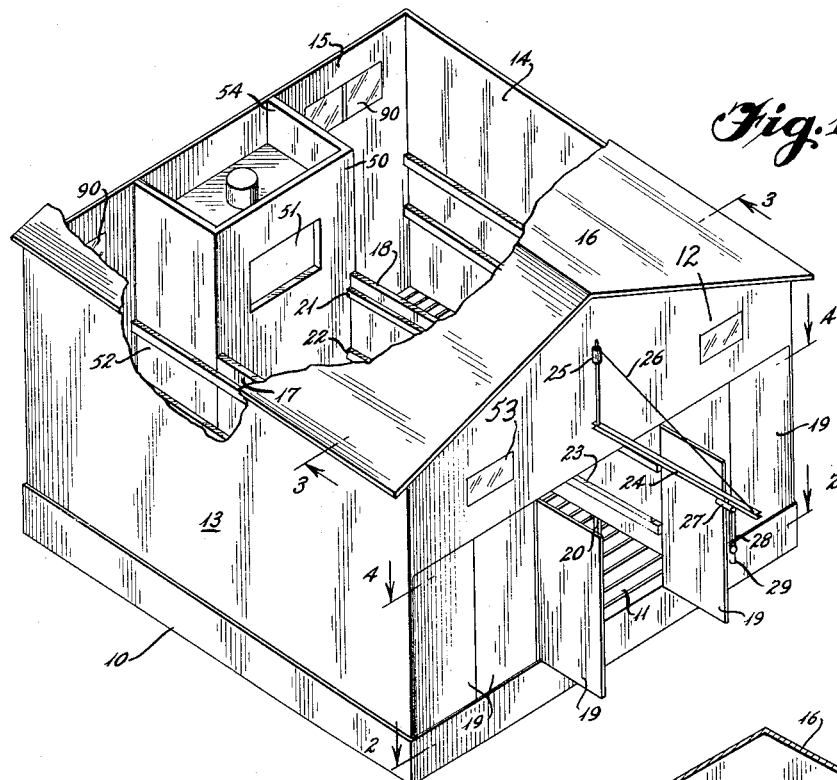

Feb. 8, 1966　　　J. G. LONG ETAL　　　3,233,339
TOBACCO BARN

Filed Nov. 6, 1961　　　　　　　　　　　　7 Sheets-Sheet 1

INVENTORS
WILLIAM R. LONG,
JOHN G. LONG and
PHILIP J. T. RAWLINS

BY

ATTORNEY

INVENTORS
WILLIAM R. LONG,
JOHN G. LONG and
PHILIP J.T. RAWLINS

BY

ATTORNEY

Feb. 8, 1966 J. G. LONG ETAL 3,233,339
TOBACCO BARN
Filed Nov. 6, 1961 7 Sheets-Sheet 4
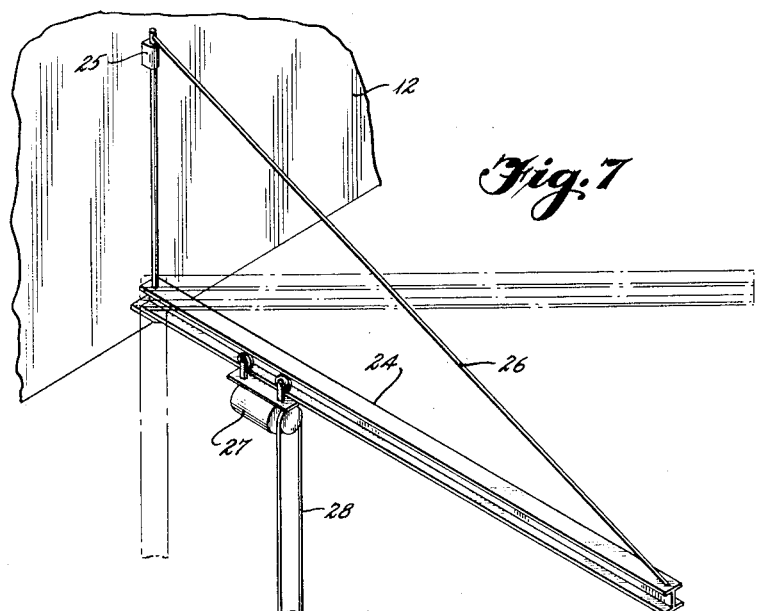
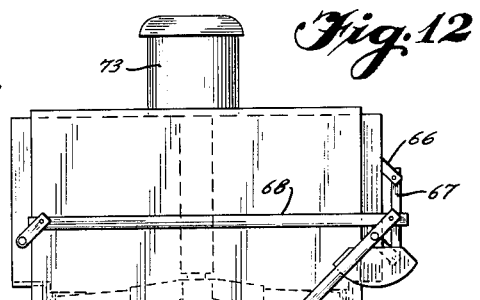
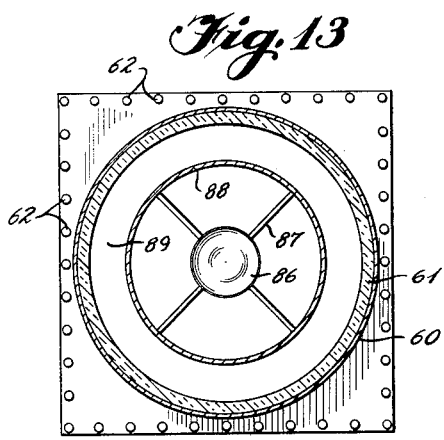
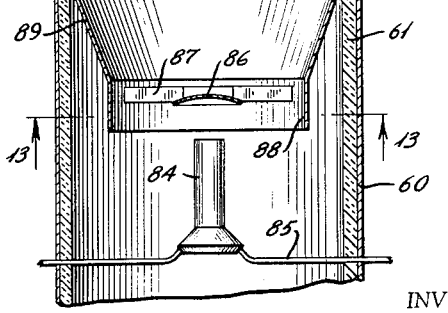
INVENTORS
WILLIAM R. LONG,
JOHN G. LONG and
PHILIP J.T. RAWLINS
BY
ATTORNEY Feb. 8, 1966   J. G. LONG ETAL   3,233,339
TOBACCO BARN
Filed Nov. 6, 1961   7 Sheets-Sheet 5
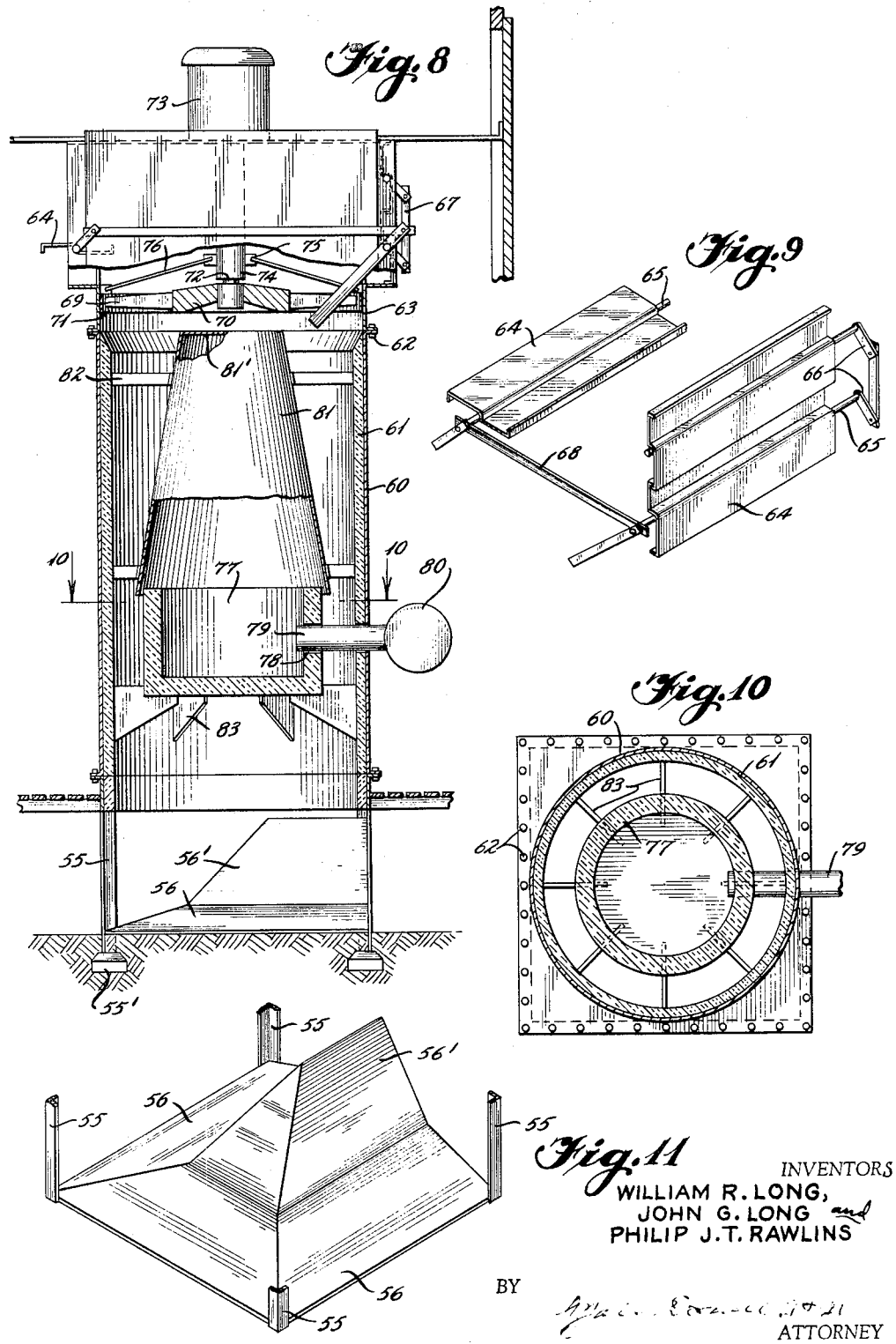
INVENTORS
WILLIAM R. LONG,
JOHN G. LONG and
PHILIP J.T. RAWLINS
BY
ATTORNEY

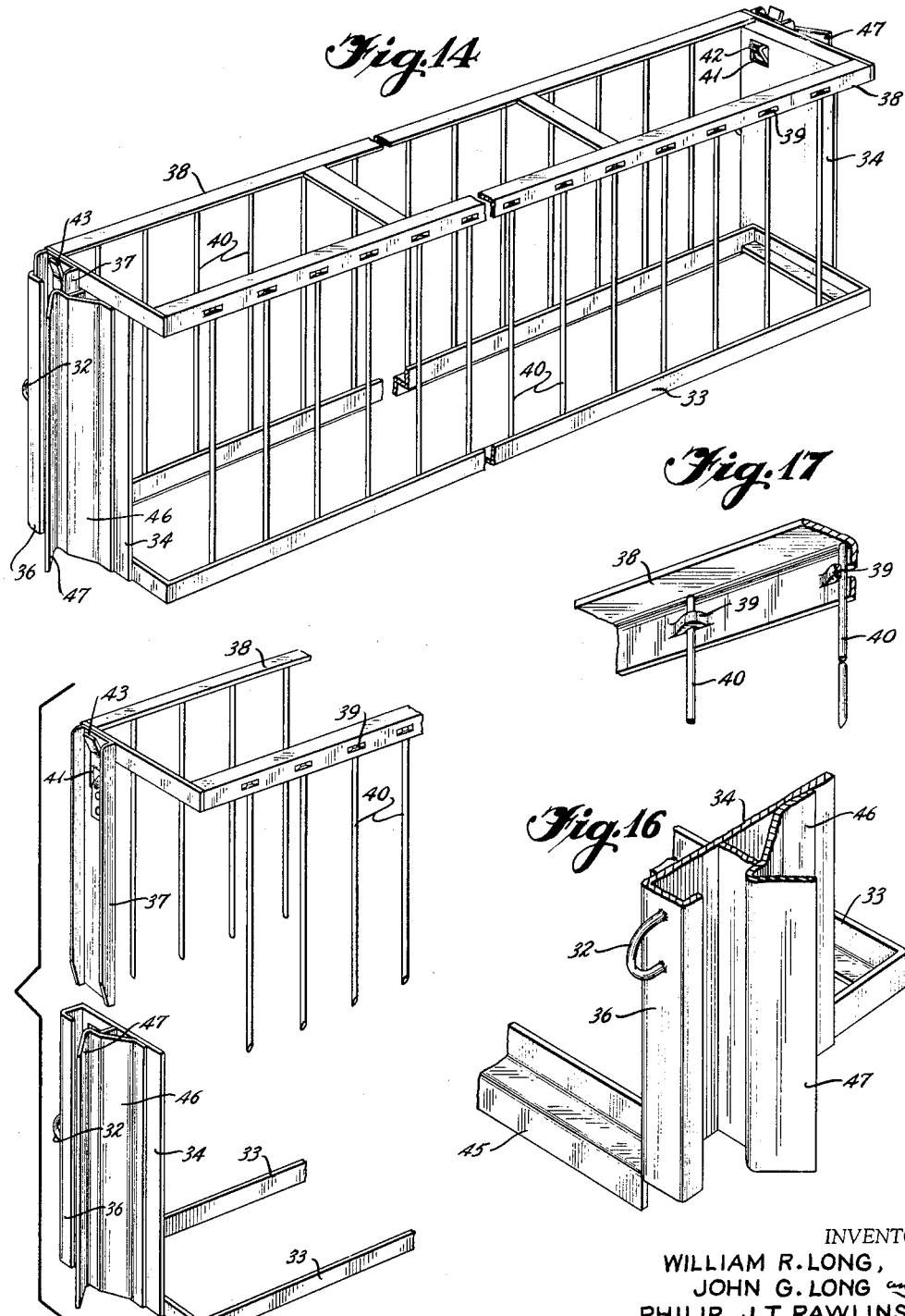

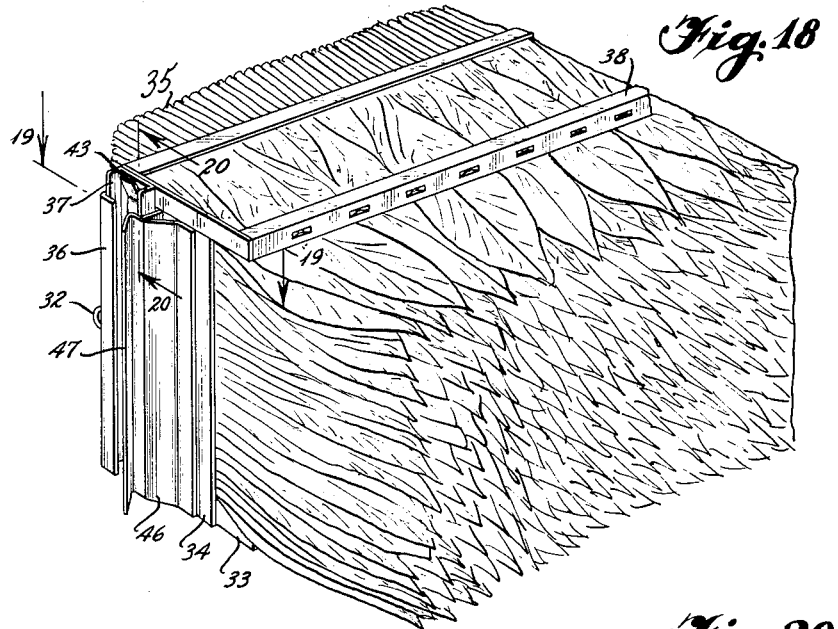
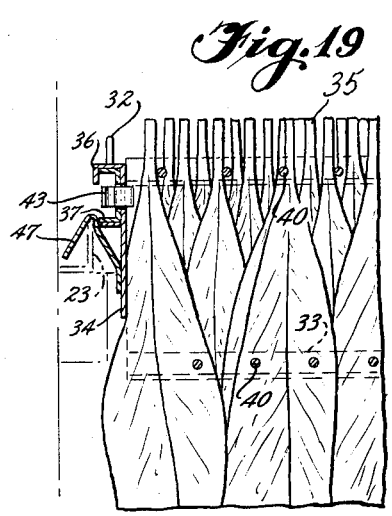
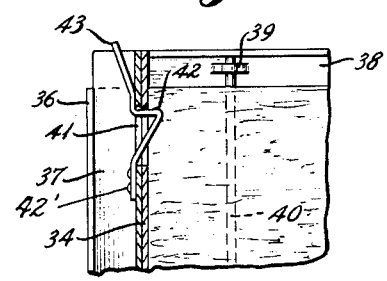
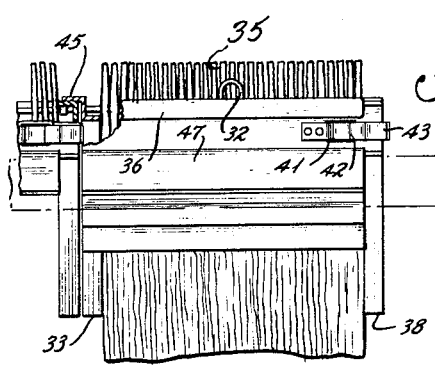

United States Patent Office 3,233,339
Patented Feb. 8, 1966

1

3,233,339
TOBACCO BARN
John G. Long, William R. Long, and Philip J. T. Rawlins, Tarboro, N.C., assignors to Long Manufacturing Company, Tarboro, N.C.
Filed Nov. 6, 1961, Ser. No. 150,421
9 Claims. (Cl. 34—225)

This invention relates to the harvesting, handling and curing of tobacco, and to apparatus and equipment employed in connection with such operations for the purpose of reducing the amount of time and labor involved in accomplishing the various operations necessary for the obtaining of the desired results.

The invention relates particularly to harvesting apparatus and the methods employed in connection with the detachment of the leaves of the tobacco from the stalks on which they are grown, the placing of the attached leaves in a holder or carrier for handling and transportation, and the depositing of the holders or carriers with the contained tobacco in a barn where the tobacco is cured, the invention being concerned especially with the barn and associated equipment.

Tobacco has been harvested, loosely attached to sticks and such sticks suspended in barns, with the leaves of the tobacco cured substantially individually. Efforts have been made also to cure the harvested leaves of tobacco in a large compact mass or in bulk, but such apparatus and the methods employed have not been entirely satisfactory.

It is an object of the invention to provide apparatus, including a tobacco barn and associated equipment, by which tobacco can be readily compactly held, handled, the barn filled, the tobacco cured, and removed, and which equipment is of simple and inexpensive construction and can be easily produced from readily available materials, and which apparatus will facilitate the saving of time, labor and cost involved in the treatment of the tobacco.

Another object of the invention is to provide a tobacco barn having individual rooms for the tobacco, with a common underlying area, and with a floor having spaced openings for circulation of the heated air from the common area into the rooms above the floor containing tobacco and in contact with which the heated air is forced, as well as thermostatically controlled heating means for the air, and power means for forcing the heated air into the common area and into the tobacco filled rooms and for withdrawing air from the rooms for reheating by the heating means as well as for modifying the moisture content by removing and replacing some of the air.

Another object of the invention is to provide a tobacco barn with multiple rooms and rails in such rooms on which the tobacco can be supported in bulk in carriers or holders, and with loading and unloading means for facilitating the filling of the rooms and the removal of the tobacco therefrom after it has been cured.

A further object of the invention is to provide thermostatically controlled heating means for air and having a connection to a common area for the distribution of the air, and including means for reducing the rate of movement of air in such but providing sufficient pressure head to force the flow of the heating air through tobacco to be cured.

Other objects and advantages, include air circulating means in the form of a fan located at a remote point but driven from a motor exteriorly of the path of the heat and moisture of the circulating air.

Figure 2:
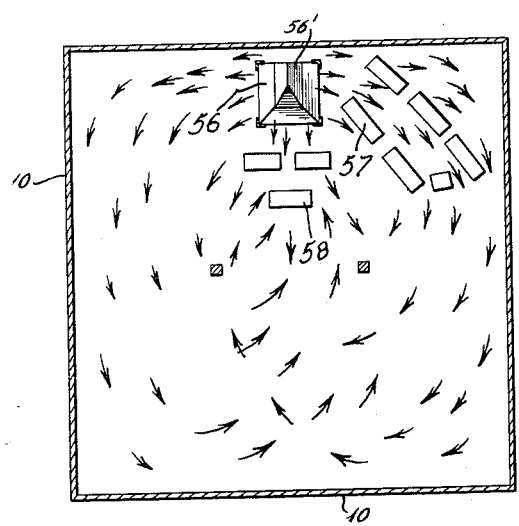
Figure 3:
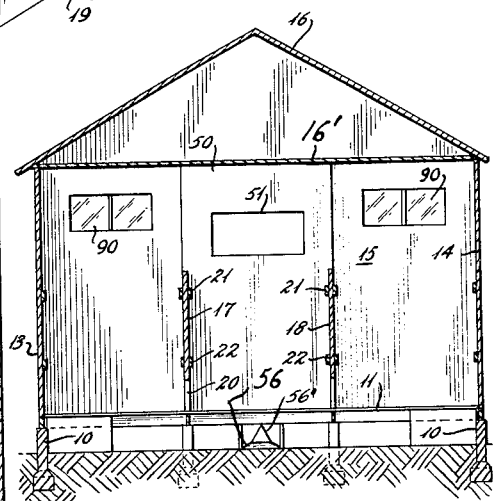
Figure 4:
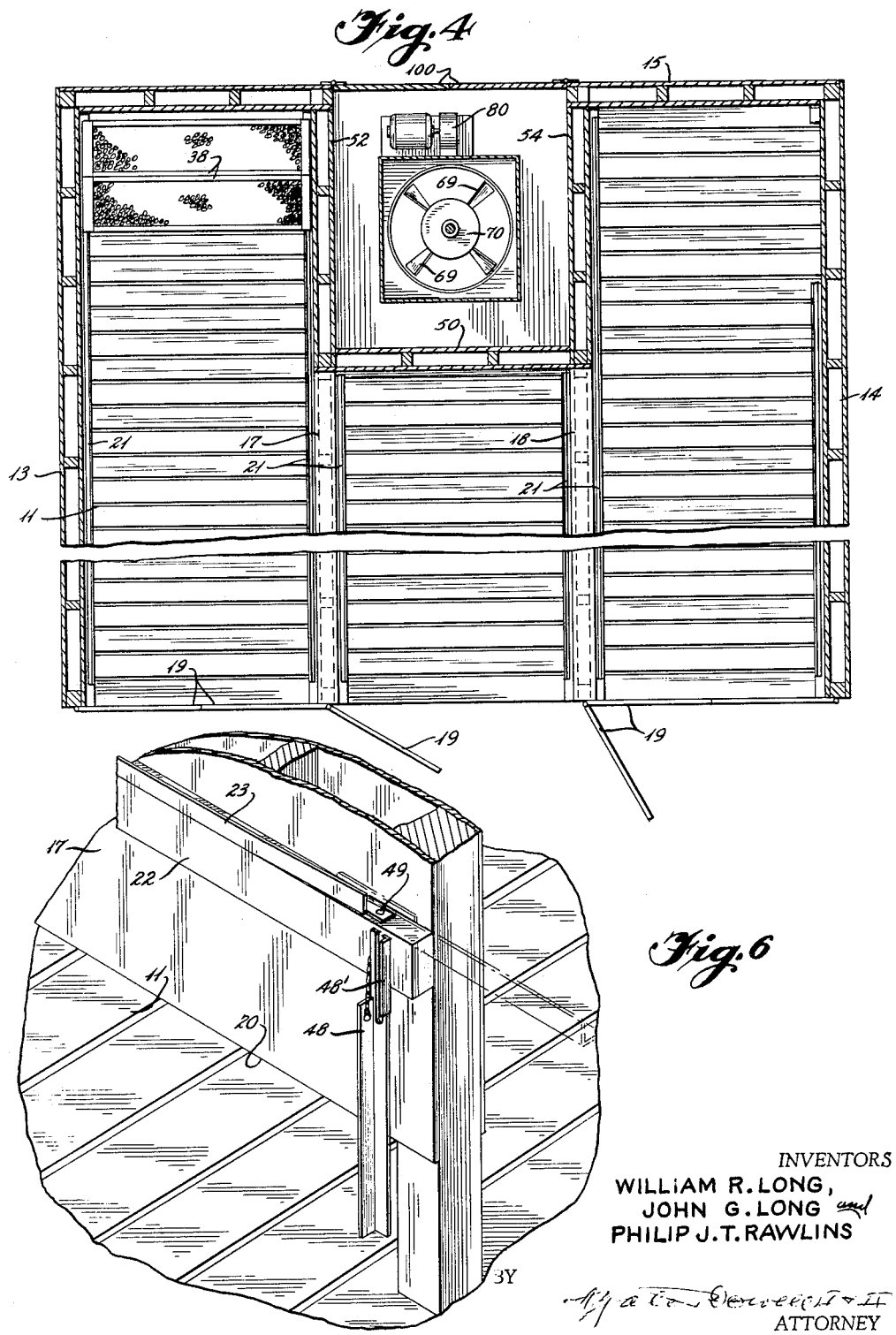
Figure 5:
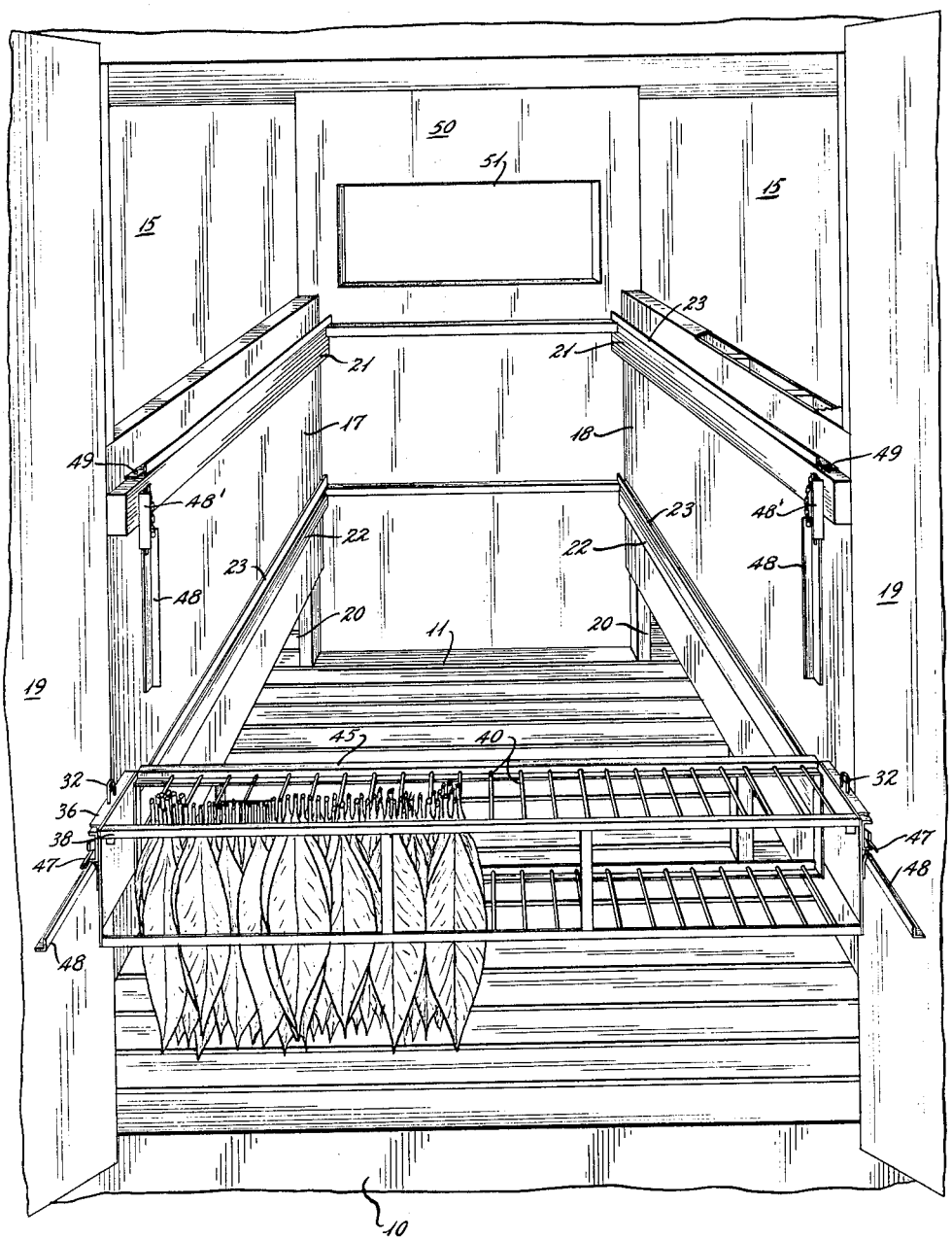

Other objects and advantages of the invention will be apparent from the following description taken in conjunction with the accompanying drawings in which:

FIG. 1 is a perspective of a tobacco barn with parts broken away and illustrating one application of the invention;

FIG. 2, a horizontal section on the line 2—2 of FIG. 1;
FIG. 3, a vertical section on the line 3—3 of FIG. 1;
FIG. 4, a horizontal section on the line 4—4 of FIG. 1;
FIG. 5, a perspective of one of the rooms with a holder for the tobacco supported in a position to be moved back into the room;
FIG. 6, an enlarged fragmentary view of a portion of the side of a room with the rail for supporting a tobacco holder and the extension of such rail;
FIG. 7, a fragmentary detail of the slidable hoist mount;
FIG. 8, a longitudinal section of an oil-burning furnace for heating the barn;
FIG. 9, an enlarged detail of the control shutters;
FIG. 10, a section on the line 10—10 of FIG. 8;
FIG. 11, an enlarged fragmentary perspective of the baffle at the bottom of the heating chamber;
FIG. 12, a fragmentary longitudinal section of a gas burning furnace for heating the barn;
FIG. 13, a horizontal section on the line 13—13 of FIG. 12;
FIG. 14, a perspective illustrating the bulk tobacco leaf holder;
FIG. 15, a fragmentary exploded view of one end of the holder;
FIG. 16, an enlarged fragmentary view of a portion of the holder of FIG. 15 viewed from the opposite direction;
FIG. 17, an enlarged fragmentary detail illustrating the manner in which the tines are mounted in the frame of the holder;
FIG. 18, a fragmentary perspective of the holder filled with tobacco just after the top has been applied;
FIG. 19, a horizontal section taken on the line 19—19 of FIG. 18;
FIG. 20, a fragmentary vertical section on the line 20—20 of FIG. 18; and
FIG. 21, an end elevation of the rack as it is supported in the barn.

Briefly stated, the invention is a tobacco barn and related equipment for the holding, handling and curing of tobacco including the filling and emptying of the barn which has a boundary wall with a foundation in contact with the earth and on which foundation the floor and walls of the barn are supported, such floor being of spaced boards or board-like members with relatively small cracks between them and above the floor are partitions which divide the barn into independent rooms, the barn being smaller than prior barns used in the curing of tobacco and about half the height thereof but designed for accelerated curing of a larger quantity of tobacco. Within the rear central portion of the barn is a furnace chamber having a front wall parallel to the rear wall and also parallel side walls with the latter preferably spaced corresponding to the spacing of the partitions which form the rooms of the barn and with the furnace chamber immediately behind the center of a three room barn. A furnace which may use oil, gas or other fuel is mounted within the furnace chamber and heats the air which is forced against a central baffle at the bottom for dividing the air equally and causing the divided portions to travel in opposite directions into the general area beneath the floor of the barn and against baffles causing the air to move forwardly and spread over the area beneath the floor as well as to move at a slower rate, after which the air moves upwardly through the cracks in the floor and through the tobacco and is returned through the opening in the upper portion of the walls into the furnace chamber.

Each of the rooms of the barn is provided with pairs of horizontal side rails with the rails of each pair at the same height and adapted to receive thereon the opposite ends of a carrier for the tobacco, such rails being provided with extensions which can be moved to a forward position to receive the holders of tobacco thereon so that such holders may be caused to slide rearwardly on the supporting rails and into the respective room of the barn where it remains until it is cured. The front of the barn is provided with a swinging arm or support and a hoist so that the holder filled with tobacco can be elevated onto and from the rails of the barn.

With continued reference to the drawings, the barn has an outside foundation wall 10 extending to a height above ground level, with four sides which may be of substantially equal length. On the foundation wall 10 is supported spaced board-like members 11, which form the floor of the barn with an enclosed airflow space beneath it which is above ground level. These board-like members may be of any appropriate size for example 6½" in width and spaced ½" apart, or of other appropriate spacing.

The barn is provided with a front wall 12, right and left side walls 13 and 14, a rear wall 15 and a roof 16 with a ceiling 16'; within the barn there are a pair of partitions 17 and 18, which divide the interior of the barn into three rooms extending from front to rear, and each room being provided at the front with a pair of doors 19. The partitions 17 and 18 are spaced from the top or ceiling of the barn and extend downwardly to a position near and parallel to the floor and are supported along their lower portions by brackets 20, thus the complete areas beneath and above the floor and adjacent to the roof are open to allow free horizontal air circulation.

On each of the parallel partitions 17 and 18 are two pairs of side rails 21 and 22 which may be 2" x 4" in cross-section, each having thereon a load-bearing rail 23 of angular cross-section, one angle located upwardly in spaced relation to the wall on which the rails are mounted in order that the end of the holders of the tobacco can readily slide thereon.

In order to facilitate the movement of the tobacco into and from the barn a swinging arm 24 (FIGS. 1 and 7) is mounted on hinges 25 on the front wall 12, and having a supporting brace 26 extending to the outer end of the swinging arm 24. Mounted for movement along the swinging arm is a hoist 27, including a cable 28 and a hook 29. The hoist may be of conventional construction and have a pair of cables 30 extending from the hook 29 with hooks 31 at the ends of such cables adapted to be engaged in the handles 32 or other location to a container or holder sometimes referred to as a rack for picking up the same filled with tobacco in order to place it upon the rails 21 and 22 and move it into one of the rooms of the barn until each of such rooms is filled.

Each holder or rack for the tobacco is designed to carry a substantial mass or bulk many times the weight of tobacco previously carried on the smaller wooden tobacco stick and as a result a greater quantity of tobacco is compactly held. The base of the holder or rack is a generally rectangular frame 33 which may be hollow and of angle iron or other construction and with fixed upright ends or stanchions 34 between which the leaves of tobacco are adapted to be placed with the stems 35 at the same side of the base 33 until the tobacco compressed merely by its own weight is piled a substantial distance above the upright ends or stanchions which incidently may be of a height of 16" or other preferred dimension.

On the outer or remote sides of the upright ends or stanchions are guideway-forming channel members 36 for receiving the tongues or guides 37 of a top or cap 38 applied to retain the tobacco in the holder compressed against the base 33. The top or cap 38 likewise may be a hollow rectangular frame of angle iron construction the sides of which have struck up portions 39 along the same in which are received parallel tines or prongs 40 which overlap the base when the top is applied. The prongs pierce the leaves of tobacco and retain them in the holder.

The top 38 may be readily produced by a conventional machine continuously with the tines attached. The guideways and guides facilitate assembly of the base and the top by a workman unassisted, latching means being provided in the form of an opening 41 in the guideway for receipt of a spring latch 42 secured by fasteners 42' to the guideways forming member, said spring latch 42 having a manipulating portion 43 by which it may be released for removing the top from the holder.

The cooperating guideways 36 and guides 37 on the ends of the bottom 33 and top 38 of the holder are near one side of the holder, substantially midway the length of and located nearer one edge of the holder than the other, and for lifting means may be provided such as for example on a lifting eye or handle 32, which when the holder is in position to be filled is placed near and parallel to an upright wall so that the leaves can be inserted in the holder with the stems against the wall. After filling the holder the top is applied and the holder with the contained tobacco leaves may be lifted by the handles 32 with the stems of the tobacco upward and the leaves extending downwardly.

In order to determine the position of the holder relative to the upright wall the base of the holder may have a dependent flange 45 which can be received in a slot or groove, in a supporting surface. It is intended that the holders be filled with tobacco as it is harvested, the holders being adapted to be received on the tobacco harvester or on a truck or other vehicle and then transported to and placed in the barn for curing. If preferred holders may be disposed in any convenient location in a suitable position to allow them to be filled with loose leaves of tobacco gathered and transported with conventional equipment.

To provide cooperative means for supporting and aligning the holders or racks in the barn such holders may have hangers 46 composed of plates welded or otherwise fixed lengthwise along the ends or stanchions of the holder and with diverging side angle portions 47 along the length of the stanchions so that when the holder is supported at its ends by the handles 32 it may readily be placed upon the load bearing rails 23 within the diverging sides of the hangers or slide-rail engaging members of the holder and which diverging sides resist misalignment that could cause jamming. The hangers also are of a construction to minimize the force necessary to produce sliding motion of the holders when they are placed in a barn with such rails received in the angles 47.

In view of the fact that the holder filled with tobacco may weigh well above 100 lbs. means is provided for facilitating the placing of the holders filled with tobacco in the barn and the subsequent removal thereof. Such means includes an extension rail 48 which when the doors 19 of the barn are open can be outwardly extended beyond the front of the barn in order that the holder may be more easily received. The extension rails being of angle iron construction like the rails 23 or with a horizontal portion and an upright portion, the latter being insertable beneath the forward end of the rail 23 and the rivet 49 for locating such extension rail in alignment with rail 23. It is intended that any preferred form of rails may be used. The extension rail 48 has an upright flange 48' in parallel relation to the rail forming portion of the member in order that such flange may fit behind the load bearing rail 23 for assisting in retaining the parts in assembled relation.

The hoist 27 may readily be used for the filling of the barn with tobacco and for emptying the barn by applying the hooks 31 of the cables 30 in the handles 32 of the holders, or to other portions of the holder.

It will be understood that a barn is provided which may be of a room or rooms, three of such rooms being illustrated each fully open at the front with double doors and each room having parallel walls with pairs of rails 23 in opposed relation on opposite walls to support the ends of a tobacco holder or carrier to be placed on the rail extensions at the doors and moved rearwardly onto and along the rails 23 until the room or compartment is filled, after which curing can be accomplished. The tobacco may then be removed from the barn in like manner.

In order that the air within the barn may have the proper temperature and humidity and be circulated at the proper rate, a furnace chamber or compartment is provided inset in the rear of the barn so that it reduces the depth of the central room of the barn. The furnace chamber has a front wall 50 with an opening 51 in its upper portion for the return of air, side walls 52 and 54, such opening being for the return of air to be reheated and recirculated. The walls 50, 52 and 54 extend from the ceiling 16' to the floor 11.

The floor 11 is provided with an opening into the enclosed airflow space therebelow in which multiple furnace supports 55 in the form of angle irons are located. Such furnace supports are mounted on foundation members 55' extending below the enclosed airflow space and located within this enclosed airflow space between the furnace supports is a base member 56 having a multi-sided polygonal central air distributing baffle 56' designed to cause air to move laterally and forwardly in the lower airflow space from the furnace room. Additional baffles 57 and 58 are provided within the airflow space formed by marginal foundation wall 10, so that the air will be diverted forwardly in a plurality of directions and its rate of movement reduced.

The furnace chamber may be heated in any appropriate manner, for example, by means of a casing 60 having an insulating lining 61 the top of such furnace casing 60 being attached by bolts or other fasteners 62 with the lower portion of a housing 63 into which the return air is received being controlled by shutters 64 mounted on rods 65 and with control linkage 66, 67 and 68 by which the shutters are adjusted. In the lower portion of the housing 63 is located a bladed fan 69 having a hub 70 the fan rotating within a ring 71 and having its hub mounted on the lower end of a shaft 72 the upper end of which is connected to be driven by a motor 73 the shaft 72 being mounted in a housing 74 the housing being braced by means of a bracket 75 in a series of radial supports 76 attached to the casing 63.

The motor 73 is out of the path of travel of the circulating air with its heat and moisture which enhances its durability. Thee fan forces the air downwardly through the casing 60 such air being subjected to heat from an open top combustion chamber 77 having an opening 78 through which the discharge end 79 of a gun type oil burner 80 extend into the interior of the combustion chamber.

A frusto conical heat exchanger 81 is mounted over the combustion chamber its large end being slightly larger than and overlapping the chamber and the upper smaller end 81' of the heat exchanger terminating near the hub 70 of the fan, the heat exchanger being mounted by means of brackets 82 and the combustion chamber being mounted by brackets 83.

Instead of relying on oil for the supply of heat, the heat may be obtained from a gas burner 84 (FIG. 12) preferably mounted by brackets 85 in upright position with its upper end slightly spaced from a concave baffle 86 mounted by spider brackets 87 attached to a sleeve 88 at the lower smaller end of a frusto conical member 89 the upper end of which is attached to the sleeve 63. In each embodiment the burner unit is mounted within the casing 60 below the fan housing 63 so that air is forced downwardly through the areas where it is heated, the fan being driven by a motor outside of the flow of the air which enhances the durability of the motor due to the fact that the tobacco is almost all moisture. In both embodiments described the frusto conical member extends from the fan housing downwardly to the combustion area effecting circulation of the heated air which passes the heated area.

In the oil fired furnace the frusto conical member forms a heat exchanger and the upper end of the same keeps a blast of air away from the combustion chamber where the oil is burned and the movement of the air through the restricted area at the lower extremity of the frusto conical heat exchanger operates to produce a higher velocity with less static pressure or as a venturi to suck the products of combustion from the combustion chamber beneath the heat exchanger with such products of combustion combining with the heated air and forced downwardly and circulated through the system, the flow of air thus being controlled and the supply of oil being controlled by a thermostat.

In the gas fired furnace similar results are obtained. The frusto conical member directs air flow through a restricted area about the flame causing the air to flow at a faster rate near the flame of the burner which causes the baffle against which the flame impinges to create a stronger back draft in the burner, thus producing intermingling of the products of combustion with the circulated air, the flow of air thus being controlled and the supply of gas controlling the rate of flow, a solenoid valve being employed for interrupting the flow of the fuel. In other words there is a pump or fan and a transformer with electrodes which ignite the fuel and due to the manner of operation blow back into the burner is prevented.

In both the oil-fired and gas-fired furnaces described the frusto conical member will cause the air to move through a constricted area close to the flames of combustion. In each case heat will be imparted to the frusto conical member and the surrounding areas to heat the air with the products of combustion being taken with the air. In both types of furnaces the air flow is axial and not centrifugal and since the fan is driven by a motor located exteriorly of the air flow a much less expensive installation is obtained.

In addition to the air shutters 64, which control the return air and the circulation of the air, additional openings or shutters 90, may be provided in the rear wall 15 of the barn as well as openings 53 in the front wall of the barn for escape of used air and admission of fresh air.

The hub of the fan may be approximately 16" in diameter and in the oil fired furnace the top of the frusto conical heat exchange is approximately of a size slightly smaller than the hub of the fan and is spaced slightly therefrom as for example, approximately 1". In the gas fired furnace the small end of the frusto conical member terminates near the plane of the baffle on which the flame from the burner top impinges, the burner top being approximately 5" from the baffle. The lower end of the frusto conical section of the oil burner projects slightly below the combustion chamber for example, 1" to 1½" leaving a small opening for the escape of the products of combustion and causing them to combine with the air blown over the heat exchanger by the fan. In other words, due to the overlapping of the parts and the direction of air flow an injection effect is produced on the products of combustion.

In the operation of the barn, holders containing a relatively large mass of tobacco in compressed condition and weighing from 130 to 175 lbs. are elevated by the swinging hoist from a transporting vehicle or the like and placed along the front of the parallel rails 21 and 22 of the curing room, the double doors at the front of such rooms being open, the holders are then moved into the barn until the latter is filled, the front doors are closed and the furnace is operated to heat the air and the fan operated to produce the necessary circulation, the controls being at the proper settings and dependent upon both temperature and humidity. Air is forced downwardly by the fan, through the heated area, under the floor, and in contact with the baffles so that its movement is slowed and it is caused to spread over the entire area and then is forced upwardly through the cracks in the floors and through the tobacco in the holders or carriers and back to the heating chamber to be additionally heated. During the circulation some of the air is exhausted from the barn and is replaced by outside air. The controls are such that there is a constant air flow through the furnace of varying admixtures of return and fresh air varying the moisture content of the air entering the barn and the linkage arrangement is such that there is coaction between the exhaust and admission of air.

The moisture content of the air in the barn may be controlled by barometric dampers, although a common way is for an operator wearing spectacles to observe the air being discharged through the windows of the barn, the desirable moisture content being recognized by a slight frosting of the lenses thereof.

The furnace chamber may be provided with a pair of doors 100 at its rear openable to the exterior of the barn. These doors are not necessary and where provided necessarily they must be vented to admit air to the combustion chamber to sustain combustion.

It will be obvious to one skilled in the art that various changes may be made in the invention without departing from the spirit and scope thereof and therefore the invention is not limited by that which is illustrated in the drawings and described in the specification, but only as indicated in the accompanying claims:

What is claimed is:

1. A tobacco barn having an imperforate foundation wall constituting a support therefor and extending to a height above ground level,
    side wall structure forming front, side, and back walls mounted on and supported by said foundation wall and correspondingly spaced above ground level,
    a floor supportingly mounted on said foundation wall thereby forming an enclosed airflow space above ground level beneath said floor and extending throughout the entire area of the barn,
    said floor having a plurality of airflow passageways through the entirety thereof to provide for flow of air upwardly from said enclosed airflow space throughout the entire area of said barn above said floor,
    partition means mounted in said barn and spaced above said floor defining side-by-side curing rooms and providing for free airflow between said rooms,
    said front wall forming the front walls of said curing rooms and including a door-closable opening for each one thereof,
    interior walls forming compartment means remote from said front wall and extending above said floor within the barn formed by said side walls,
    the bottom of said compartment means being open to said enclosed airflow space beneath said floor,
    means in said compartment means disposed above said floor for heating air and for forcing the air downwardly into said enclosed airflow space beneath said floor,
    means in said enclosed airflow space below said floor positioned in operative relation to said compartment means to direct downwardly forced warm airflow therefrom into a plurality of directions to effect a uniform distribution of the warm air throughout said enclosed airflow space thereby to provide for an evenly distributed upward flow through said floor apertures throughout each of said side-by-side curing rooms,
    pairs of spaced-apart rails stationarily mounted on said partition means and in each of said curing rooms for stationarily supporting holders of tobacco in bulk thereon while being cured,
    said pairs of rails having demountably attached rail extensions at one end thereof to extend exteriorly of the barn through said door-closable openings to support holders of tobacco in bulk prior to such holders being moved through said door-closable openings into said curing rooms.

2. A tobacco barn as defined in claim 1 wherein:
    said compartment means includes access means openable to the exterior of the barn,
    certain of said interior walls having passage means for the circulation of air therethrough between the heat supplying and tobacco curing areas,
    said means for heating air comprising a furnace casing in said compartment means,
    said furnace casing having its upper portion in return airflow communication with said passage means and its lower end discharging into said lower enclosed airflow space beneath said floor,
    said means in said enclosed airflow space below said floor comprising baffle means angularly mounted and positioned relative to the discharge of air from said furnace casing for controlling the direction and force of the flow of the air through said lower enclosed airflow space.

3. A tobacco barn having an imperforate foundation wall constituting a support therefor and extending to a height above ground level,
    said wall structure forming front, side and back walls mounted on and supported by said foundation wall and correspondingly spaced above ground level,
    a floor supportingly mounted on said foundation wall thereby forming an enclosed airflow space above ground level beneath said floor and extending throughout the entire area of the barn,
    said floor having a plurality of airflow passageways therethrough to provide for flow of air upwardly from said enclosed airflow space throughout the entire area of said barn above said floor,
    partition means mounted in said barn and spaced above said floor defining side-by-side curing rooms and providing for free airflow between said rooms,
    said front wall forming the front walls of said curing rooms and including a door-closable opening for each one thereof,
    interior walls forming compartment means remote from said front wall and extending above said floor within the barn formed by said side walls,
    the bottom of said compartment means being open to said enclosed airflow space beneath said floor,
    said compartment means comprising a furnace room having furnace casing means therein for heating the air in said barn,
    certain of said walls forming passages for the circulation of air between the said furnace room and said tobacco curing rooms,
    said furnace casing means in said furnace room having the upper portion thereof in return airflow communication with certain of said passages and its lower end discharging into said lower enclosed airflow area beneath said floor,
    a fan mounted at the upper end of said furnace casing for producing downwardly forced air circulation therein, and
    means angularly mounted within said enclosed lower airflow space relative to the discharge of air from said furnace casing for deflecting and controlling the flow of air throughout said lower enclosed airflow space.

4. The structure as defined in claim 3 including
    a shaft extending upwardly from said fan within the return path of airflow to said furnace casing to a position exteriorly thereof and of the path of the downward flow of air produced by said fan,
    a motor located exteriorly of the flow of air and connected to drive said fan, said furnace casing having a heating area intermediate its length, a tapered sleeve of relatively long length in said casing extending downwardly from a location in proximity to said fan to a location adjacent said intermediate heating area providing a construction of the air about said heating area to statically reduce the pressure of the air and increase its velocity of flow downwardly past said intermediate heating area.

5. The structure of claim 3 having means for varying the proportion of recirculated and fresh air in the system, said last-mentioned means comprising aperture means in certain of said walls for the admission of fresh air to said barn, a housing mounted on and open to the top of said furnace chamber and having at least one aperture means therein for the return of circulated air to the furnace chamber, and means to variably adjust the flow of air through at least one of said aperture means.

6. The structure of claim 1 wherein said means for heating the air in said barn comprises a furnace chamber inset within said barn and forming a part of said wall structure, a furnace including a casing in said chamber, said furnace casing at its upper end having connections for receiving air circulating from said rooms, said heating means including fan means adjacent said connections for forcing air downwardly into the furnace casing to increase the velocity of said air therethrough for discharge to the enclosed airflow space beneath said floor.

7. The structure of claim 6 including a multi-sided polygonal baffle means positioned below said furnace and in the enclosed airflow space beneath said floor and in the downward path of the air thereto, and additional baffle means angularly positioned in said enclosed airflow space relative to the discharge path of the air thereto, both said baffle means effectively directing and reducing the rate of air flow throughout the area of the enclosed airflow space beneath said floor.

8. The structure of claim 6 wherein said furnace casing includes stationarily mounted combustion chamber means providing a heating area, said combustion chamber means comprising a tapered elongated heat exchanger sleeve unit for constricting airflow through said furnace casing and transmitting heat thereto relative to said heating area, means for controlling the admission of circulated air from said rooms to said furnace, and means for controlling the supply of fresh air to the circulated air in the barn.

9. The structure of claim 3 including means on said furnace casing means for adjustably controlling the flow of air in the barn, and holders for tobacco in bulk in the barn, said holders having angular side portions which when the holders are placed in intimate relation on the rails in the barn aligningly overlap therewith.

References Cited by the Examiner

UNITED STATES PATENTS

| | | | |
|---|---|---|---|
| 1,149,948 | 8/1915 | Rand | 34—233 |
| 1,624,639 | 4/1927 | Thomasen | 34—222 |
| 1,757,647 | 5/1930 | Mueller | 34—221 |
| 2,082,289 | 6/1937 | Hodgin | 34—220 |
| 2,364,722 | 12/1944 | Kazantzeff. | |
| 2,505,973 | 5/1950 | Julian | 34—191 |
| 2,678,115 | 5/1954 | Bogaty et al. | 34—225 |
| 2,752,096 | 6/1956 | Stevens et al. | 131—134 X |
| 2,934,832 | 5/1960 | Hancock | 34—225 |
| 2,948,408 | 8/1960 | Edridge | 394—5.5 |
| 3,056,421 | 10/1962 | Edridge | 295—5.5 |
| 3,100,145 | 8/1963 | Moore | 34—222 |
| 3,110,326 | 11/1963 | Hassler | 131—140 |
| 3,134,583 | 5/1964 | Wilson | 269—19 |

FOREIGN PATENTS 29,609    10/1930    Australia.

WILLIAM F. O'DEA, *Acting Primary Examiner.*

CHARLES E. O'CONNELL, NORMAN YUDKOFF,
*Examiners.*